United States Patent
Hammes et al.

(10) Patent No.: US 8,735,792 B2
(45) Date of Patent: May 27, 2014

(54) OPTOELECTRONIC SENSOR

(75) Inventors: Markus Hammes, Freiburg (DE); Ingolf Braune, Gundelfingen (DE); Stephan Schmitz, Freiburg (DE); Shane MacNamara, Ebringen (DE)

(73) Assignee: Sick AG, Waldkirch (DE)

( * ) Notice: Subject to any disclaimer, the term of this patent is extended or adjusted under 35 U.S.C. 154(b) by 340 days.

(21) Appl. No.: 13/208,645

(22) Filed: Aug. 12, 2011

(65) Prior Publication Data

US 2012/0074296 A1 Mar. 29, 2012

(30) Foreign Application Priority Data

Sep. 23, 2010 (DE) .......................... 10 2010 037 744

(51) Int. Cl.
*G01J 1/32* (2006.01)
*G06M 7/00* (2006.01)

(52) U.S. Cl.
USPC .......................................... 250/205; 250/221

(58) Field of Classification Search
USPC .............. 250/216, 221, 222.1, 559.3, 559.32, 250/559.33, 205; 340/630, 577, 578
See application file for complete search history.

(56) References Cited

U.S. PATENT DOCUMENTS

| | | | |
|---|---|---|---|
| 6,141,105 A | 10/2000 | Yahashi et al. | |
| 6,515,589 B2 * | 2/2003 | Schneider et al. | 340/630 |
| 2007/0263903 A1 | 11/2007 | St. Hilaire et al. | |
| 2009/0185274 A1 | 7/2009 | Shpunt | |

FOREIGN PATENT DOCUMENTS

DE 41 25 479 A1 2/1993
(Continued)

OTHER PUBLICATIONS

German Search Report issued on Jun. 9, 2011, for corresponding German Application No. 10 2010 037 744.9, four (4) pages.

(Continued)

*Primary Examiner* — Que T Le
*Assistant Examiner* — Don Williams
(74) *Attorney, Agent, or Firm* — Nath, Goldberg & Meyer; Jerald L. Meyer; Stanley Protigal

(57) ABSTRACT

An optoelectronic sensor (10) for monitoring a working area (42) is provided, the working area (42) being located within a detection area (20) of the sensor (10) and in a first distance from the sensor (10), wherein the sensor (10) comprises an illumination unit (22) with a light source (24) for at least partially illuminating the working area (42), and an object detection unit (30) for detecting forbidden objects in the working area (42), wherein an illumination control (28) of the illumination unit (22) is configured to, during a startup period,
initially activate the illumination unit (28) with a lower power such that a provisional working area (40, 40*a-c*) in a second distance from the sensor (10) less than the first distance is illuminated at most with a predetermined maximum light output;
test whether there is a forbidden object intrusion into the provisional working area (40, 40*a-c*); and
if no forbidden object intrusion is detected, activate the illumination unit (28) with a higher power such that the working area (42) is illuminated at most with the predetermined maximum light output.
The illumination control (28) comprises a short range object detection unit (39) configured to test the provisional working area (40, 40*a-c*) in a different way than the object detection unit (30) tests the working area (42).

20 Claims, 5 Drawing Sheets

(56) References Cited

FOREIGN PATENT DOCUMENTS

Figure 1:
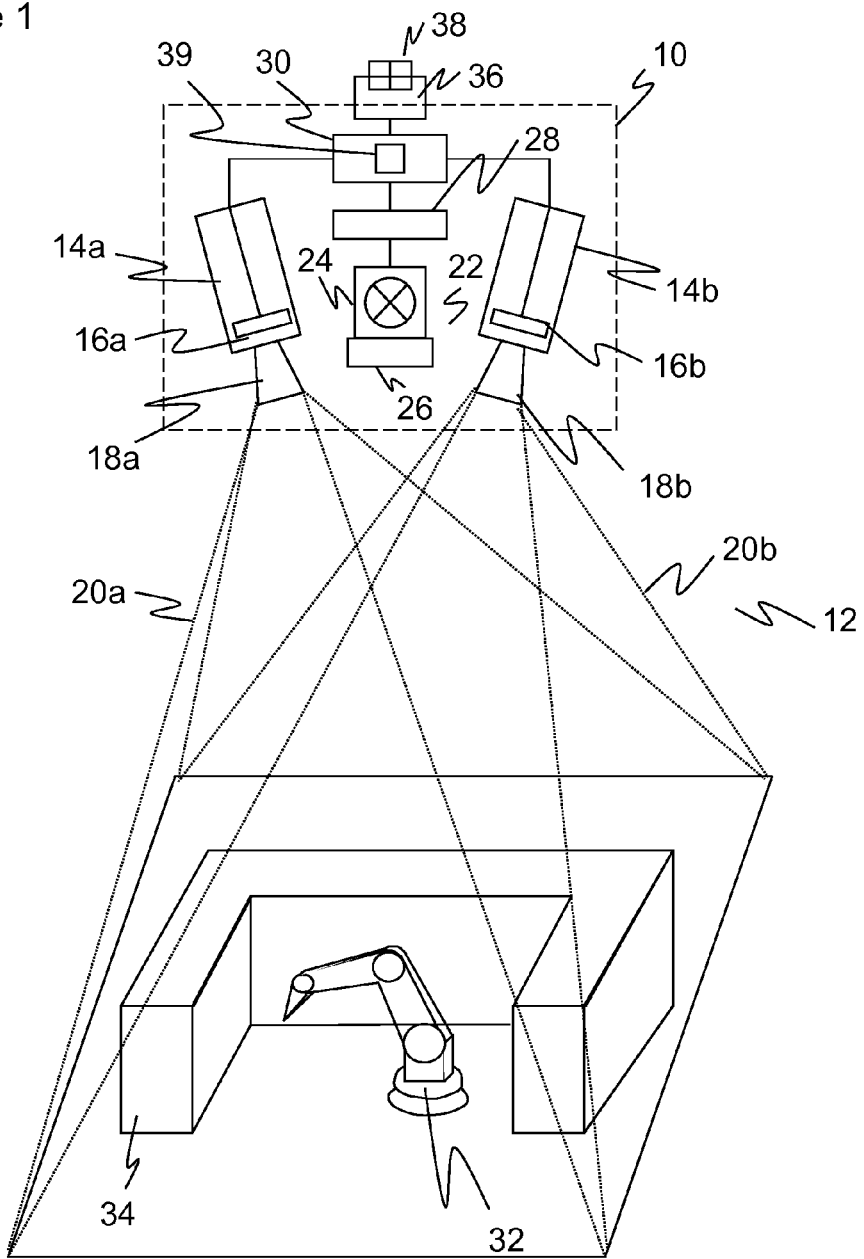

| DE | 103 10 768 A1 | 10/2003 |
|---|---|---|
| DE | 20 2007 009 722 U1 | 10/2007 |
| DE | 11 2006 000 918 T5 | 4/2008 |
| DE | 10 2009 013 735 A1 | 11/2009 |
| DE | 10 2009 031 732 B3 | 11/2010 |
| EP | 1 543 270 A1 | 6/2005 |
| EP | 1 936 400 A1 | 6/2008 |
| GB | 2 295 740 A | 6/1996 |

OTHER PUBLICATIONS

European Patent Office, Office Action, Application No. 11 172 768.1, mailed Apr. 11, 2013, eight(8) pages.
Iocchi, et al., "A Multiresolution Stereo Vision System for Mobile Robots," Proc. of AI*IA Workshop on New Trends in Robotics, (1998), XP55007674, six (6) pages, http://www.dis.uniroma1.it/~iocchi/publications/iocchi-aiiaws98.pdf.
Goulette, et al., "Chaptire 1: Capteurs et numérisation 3D," Image de profondeur, Jean Gallice (Ed.), (2002), XP000002659578, pp. 22-75.
European Search Report, Application No. EP 11 17 2768, dated Oct. 7, 2011.

* cited by examiner

OPTOELECTRONIC SENSOR

The invention relates to an optoelectronic sensor and a method for monitoring a working area according to the preamble of claims 1 and 15, respectively.

Numerous optoelectronic sensors use a laser illumination, and their share is still growing because modern semiconductor lasers have many advantageous properties, such as high efficiency, high spectral definition, and high availability, and are also subject to a considerable price decline. Due to eye protection requirements, laser illuminations can either only be operated with strong restrictions to the optical output power, or they have to be classified in higher laser safety classes, for example above class 1M in classes 3R, 3B, or 4 according to EN 60 825. The strict requirements for operating the device at the higher safety classes are generally not acceptable for the user.

A particular class of sensors are distance-measuring sensors. They generate depth information in their field of view, thus essentially measuring the distance of objects. Different technologies are known. A number thereof depend on an active illumination for the sensor function. For example, a distance measuring laser scanner determines a distance by transmitting short light pulses and converting the pulse's time-of-flight until reception of reflected or remitted light into object distances via the speed of light. Alternatively, amplitude modulated light is transmitted instead of light pulses, and the light's time-of-flight is determined from a phase shift. Thus, the active illumination is the scanning beam of the scanner in this case.

Light time-of-flight cameras even evaluate the time of flight of their transmission light for each pixel of their matrix-shaped image sensor and, thus, generate full depth maps, i.e. three-dimensional images, where the depth dimension is the distance determined in the individual pixels. A known imager of this type is a photonic mixer device. A scanner is also capable of generating depth maps, but it has to be deflected in two dimensions to this end, for example by scanning a scenery line by line.

Stereoscopic camera systems capture several two-dimensional images of a scenery from two slightly different perspectives. In the overlapping image areas, identical structures are identified, and distances and, thus, a three-dimensional image or a depth map is calculated from the disparity and the optical parameters of the camera system by triangulation. Stereoscopy can, in principle, also work without its own illumination. In case the scenery to be monitored has a low contrast or areas with little structure, the stereoscopic evaluation is not reliable. At least two types of errors are conceivable, namely, failing to find structural elements corresponding to each other, or an incorrect correspondence. The result is gaps in the three-dimensional images or an incorrect calculation of the distances.

Active stereo measurement systems use an illumination unit in addition to the detection system, i.e. essentially the two mutually calibrated cameras. The function of the illumination unit is to illuminate the monitored scenery with structured light and to thus generate features in the images by numerous light-dark transitions by which the stereo algorithm can extract reliable and densely spaced distance data from the scenery. Such patterns can also be irregular which mainly means for the monitoring in question that the patterns do not comprise areas that are symmetric with respect to translations.

A particular field of application for distance measuring sensors is safety technology. A typical application in safety technology is to safeguard a dangerous machine, such as a press brake or a robot, where intrusion of a body part into a danger zone around the machine causes a safeguard measure. Depending on the situation, the safeguard measure may be a shutdown of the machine or a transition into a safe position.

With the help of the depth information, protection zones can be defined more accurate and variable in safety applications, and more and better defined classes of allowed object movements can be distinguished. Examples for allowed object movements are movements of the robot itself or movements of a body part passing the dangerous machine in a different depth plane, which in itself is completely harmless, but cannot be differentiated by a two-dimensional, not distance-measuring sensor such as an ordinary camera.

Safety applications require reliable distance data in order to not overlook any forbidden intrusion and to not assign a wrong distance to an intrusion. Otherwise it could be possible that a necessary shutdown of the source of danger is missed and the health of the operating personnel is put at risk.

To that end, the illumination has to be very powerful to provide sufficient light over the entire range. This is in particular true for active stereoscopic systems, where the structure of the system's illumination has to remain visible for the stereo camera even in the presence of external light sources. In principle, one could use high power lasers in combination with optical band pass filters for separation from the ambient light. This also compensates for lack of control of surface properties or the general lighting situation. However, this is in contradiction to a requirement for the acceptance of such sensors to keep the area monitored by the sensor commonly accessible. Usually one seeks a laser safety class harmless for eye protection, like type 1 or 1M according to EN 60 825. A reduction of the optical output power beneath this limit may, depending on the detection volumes and ambient conditions, compromise the entire sensor function.

The conflicting requirements are most apparent if the actual working area, within which a distance-measuring sensor is to perform its monitoring task, has a certain distance from the sensor or has in itself a certain depth. Then, in addition to the global demands on the laser safety class, a location-dependent competition arises. Either the illumination is designed to make available the full allowable light output, such as laser safety class 1, in the working area. Then, near the sensor the laser safety class is no longer observed, or only a higher laser safety class is observed, because the light power per area decreases with the distance from the sensor, and in case of non-parallel light even with the square of the distance. If on the other hand one makes sure that the lower laser safety class is already observed in the immediate vicinity of the sensor, this severely limits the range of the system.

In US 2007/026 39 03 A1, a stereoscopic camera system generates a structured illumination pattern using an illumination unit, and the illumination pattern is used to calculate distances. The pattern is generated by a diffractive optical element that is illuminated by a laser or an LED. The document does neither discuss safety applications nor aspects of eye protection.

A passive stereo camera for securing a danger zone is disclosed in EP 1 543 270 A1, wherein a scenery analysis is performed using two algorithmically different methods. Lacking an illumination in the first place, the description does not at all address specific demands of an active illumination.

A simple approach for resolving the competition mentioned above is to accept the high laser safety classes, appoint a laser safety officer and manually clear the system only if no person is near the light source. This requires high additional costs at each startup. Moreover, the norm EN 61496 being of particular relevance for sensors used in safety technology does only allow laser safety class 1.

From DE 103 10 768 A1 a device for monitoring in three dimensions with an infrared laser light source is known, whose intensity is controlled so that it has no adverse effects on the human body.

DE 11 2006 000 918 T5 describes a laser projection system with personnel protection, where in one embodiment the power output of the laser is reduced proportionally to the distance at which personnel is detected by proximity detectors.

It is known from motor vehicles to switch off an infrared night vision system when the speed falls below a minimum speed. Above the minimum speed the light power is considered safe because the area in front of the vehicle is assumed to be free anyway.

DE 10 2009 031 732, disclosed after the priority date of this application, describes a stereoscopic system that initially tests a provisional working area with low optical power. Only if no forbidden objects are detected, the system switches to a higher laser power. The disadvantage is that the disparity range of a stereoscopic algorithm usually is not sufficient at short range, and that the individual images are saturated just when objects are present. Hence, object detection at short range may fail.

DE 10 2009 013 735 A1 discloses a sensor for monitoring a monitoring area where the sensor measures the incident power per area on an object. Upon detection of an object, the power is adapted to prevent exceeding of a predetermined value. This requires constant measurement of the incident beam power which is costly and at the same time is not reliable due to dependencies from parameters only partially known, such as object distance and remission properties of the object.

It is therefore an object of the invention to provide a reliable illumination for an optoelectronic sensor that achieves the highest possible light power.

This object is satisfied by an optoelectronic sensor according to claim 1 and a method for monitoring a working area according to claim 15.

The invention starts from the basic idea that, caused by the optical properties of the light source and in particular its strong divergence, requirements of eye protection, for example according to the norm EN 60825, are easier satisfied with increasing distance. At short range of the sensor, a lower light output is sufficient to test whether there are forbidden objects. The light output is subsequently increased to obtain the full detection performance of the sensor in the working area. At that time, a light output near the sensor that would in itself be critical is not dangerous, because it is ensured that no person is present in that area. The initial test whether a person is present near the sensor is done in a way different from the object detection during a subsequent operation. This takes account of the different detection conditions of the object detection at different distances.

From the perspective of protection of operating personnel it is sufficient to ensure that a maximum light power is not exceeded, for example a light power according to laser safety class 1. In practice, it is preferably sought to also at least largely reach the maximum light power to optimally support the sensor function.

The invention has the advantage that the laser safety of the illumination is achieved and automatically monitored in all situations. In spite of the severe demands from eye protection, for example defined by laser safety classes, the full allowable light output is available in the working area. Additional safety measures, such as necessary for higher laser safety classes, do not need to be taken.

Of course, the distance to the working area or the provisional working area has to be defined in a manner adapted to the embodiment. For example, the distance can refer to a point of the working area closest to the sensor, a near or far boundary plane of the working area, the center of mass of the working area, or a different geometric measure.

The sensor can treat any intrusion as forbidden, but also only intrusions that have not been taught or detected as allowable, like a fixed work bench, a closet, the regular working movements of a robot, or a moving pallet.

The illumination control is preferably configured to operate the illumination unit as a pulsed illumination and to control the power of the illumination unit by means of at least one of a power of single pulses, a pulse repetition frequency, and a pulse length. In this and subsequent paragraphs, the term preferably describes preferred, but optional features that are not necessarily required for the invention. With a pulsed illumination, the power can be output with a better focus, for example synchronized with reception time windows. The average optical output power can be controlled with pulse sequences in a particularly easy way, because no expensive optical feedback is necessary by varying the output power via the timing of the pulses.

The short range object detection unit preferably comprises an additional short range detector. The short range object detection unit alone or in combination with an evaluation of data from the primary sensor allows for a particularly reliable short range detection.

The short range object detection unit is preferably configured to detect forbidden objects from a saturation of a light receiver of the sensor. A close object causes a saturation of the imaging sensor in neighboring pixel groups, usually affecting a large area and at a high degree. This can be easily detected while at the same time being a very reliable indication.

The sensor is preferably made as a distance-measuring optoelectronic sensor, in particular a stereoscopic 3D-camera, a three dimensional time-of-flight camera, or a laser scanner. All these sensors are particularly sensitive to a distance-dependent decrease in laser output.

The sensor is preferably made as a stereoscopic camera with at least two image sensors and a stereoscopic evaluation unit for generating a depth map from images of the image sensors. In particular, the short range object detection unit is preferably configured to detect forbidden objects from gaps in the depth map that affect more than a maximum number of pixels, or from differences between the respective simultaneously generated images of the two image sensors that affect more than a maximum number of pixels. Object detection by stereoscopy at short range requires at least very large correlation windows and, hence, particularly high computing costs. Even with this effort, often no useful depth estimates are obtained. Therefore, a faster and more reliable method is used, where instead of trying to generate a depth map at short range, a threshold for the size of an individual, connected image area or a compound image area is set where no depth value can be estimated or where the two images differ from each other. This threshold is based on how many such pixels would be present during the regular operation mode. Large gaps in the depth maps only occur if objects approach the sensor too closely, given sufficient illumination and a powerful stereo algorithm. Likewise, two images captured simultaneously are very similar to each other unless they are very close to the sensor, where the base distance between the two image sensors has a greater impact.

The short range detection is particularly reliable if several of the methods are combined. With the redundant information from saturation, gaps in the depth map and extensive differences between right image and left image, a very reliable decision can be made.

The illumination control is preferably configured to de-energize the illumination unit or to restart the startup period if a forbidden object intrusion into the provisional working area is detected. Such intrusions are too close to the illumination unit, where during operation observance of the maximum light power limit is not guaranteed. Then, the sensor immediately switches off the illumination to protect operation personnel and, in particular, the personnel's eyes. As an alternative, the startup period is restarted, i.e. the light power is reset to a value that is harmless also close to the sensor. In this second mode, the sensor tries to go through the startup period until the forbidden intrusion ends and availability for operation can be achieved.

The illumination control is preferably configured to increase the second distance up to the first distance in distance increments and to activate the illumination unit with a higher power upon increase of the second distance such that the respective provisional working area is illuminated at most with the predetermined maximum light output. Here, the provisional working area that is illuminated with sufficient light power for the full sensor function gradually moves away from the sensor or is gradually extended until the actual working area is reached. Thus, a balance between observing the laser safety requirements and an optimal illumination is continuously maintained.

The distance increments are preferably so small that the provisional working area runs through the interval of the original second distance to the first distance virtually continuously, or the distance increments preferably correspond to a depth dimension of the working area. So either the second distance is continuously or almost continuously increased, until it corresponds to the first distance, or the distance increments are given by a thickness of the working area, i.e. its dimension in the depth direction, and provisional working areas are moved discreetly and in a block from at first close to the sensor up to the actual working area.

The higher power is preferably definable by the illumination control in dependence of the first distance or the relation of the first distance to the second distance. Based on the geometric factors it can be calculated what power increase will cause the provisional working area and, after completion of the startup period, the working area to be illuminated with the maximum, but at the same time allowable light power.

In a preferred embodiment, a shut down device is provided that is configured to detect forbidden object intrusions into the working area by means of the object detection unit in an operating phase following the startup period and to output a shutdown signal if a forbidden intrusion is detected. The high-power illumination that is present in the working area upon completion of the startup period is of particular advantage for safety applications, where detection errors would endanger the health of persons. One kind of forbidden intrusion is when a person moves too close to the sensor within the working space, for example, when the sensor is mounted to monitor from a bird's eyes view and the person uses a ladder. As an alternative, the working area encompasses the intermediate area between the source of danger to be monitored and the sensor, with the consequence of having to evaluate a larger volume for the presence of objects. In any case, the illumination is switched off before any possible intrusion into an area with too high light power. Without illumination, at the same time a shutdown signal has to be output to the monitored source of danger, because the sensor cannot any longer perform its monitoring task.

The illumination unit preferably comprises a laser light source and a pattern generating element for generating a structured light pattern in the provisional working area or the working area. Laser light sources have a high light output power, and their coherence properties can be exploited to form structured patterns with high efficiency. Also with alternative light sources such as LEDs, an output power potentially dangerous for the eyes is possible. Therefore, the invention can also be used to meet safety regulations for example according to the norm DIN 62471 that is relevant in this case.

The method in accordance with the invention can be further developed in a similar manner with additional features and shows similar advantages. Such advantageous features are described in an exemplary, but not exclusive manner in the subordinate claims following the independent claims.

Figure 2:
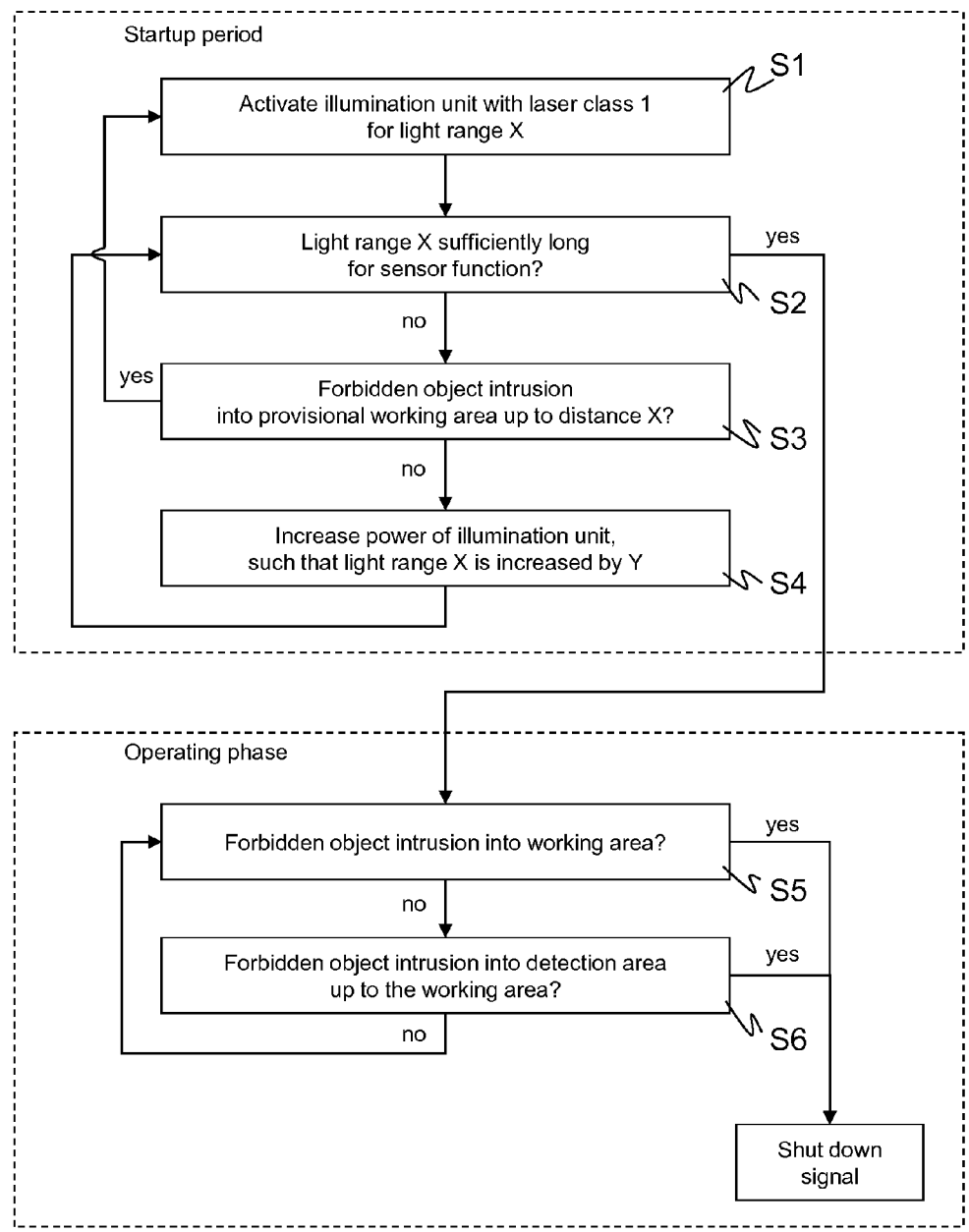
Figure 3:
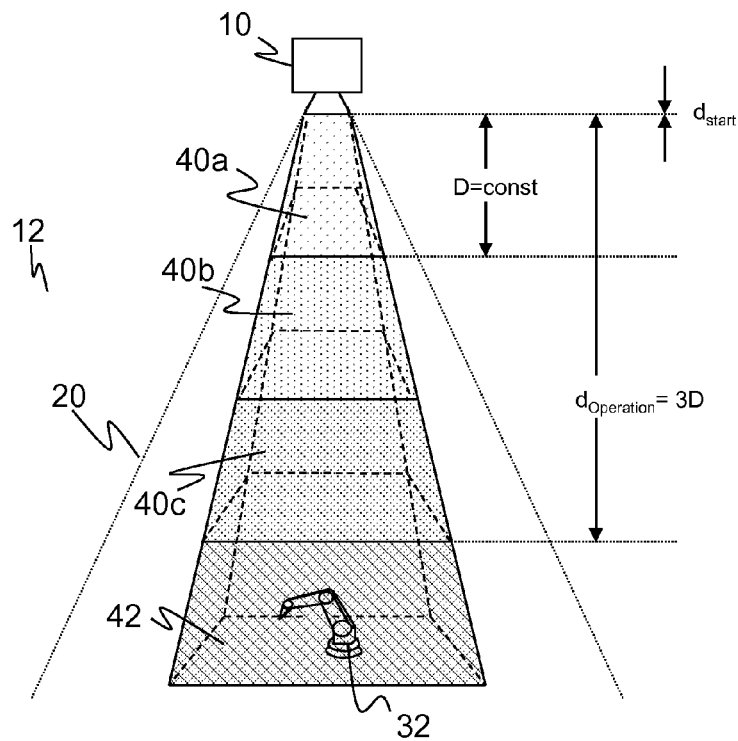
Figure 4:
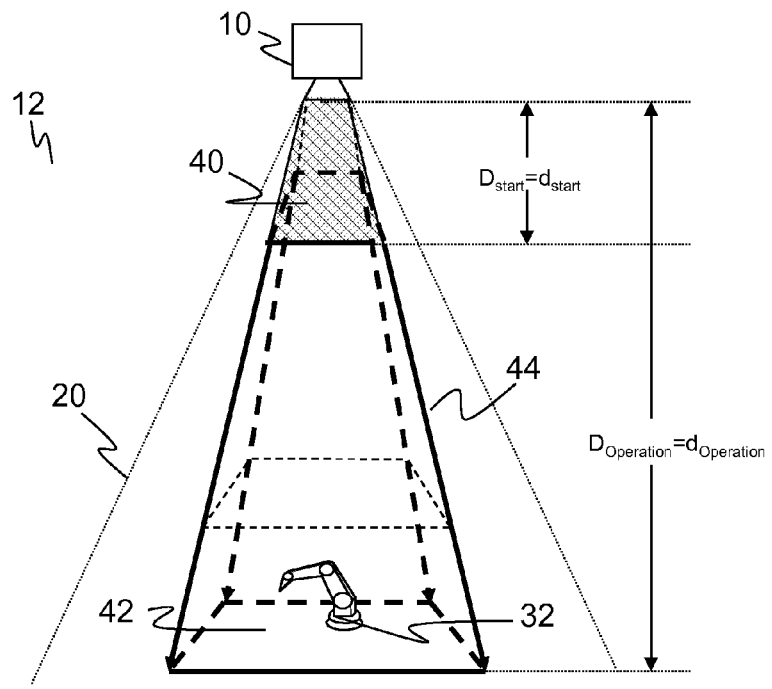
Figure 5A:
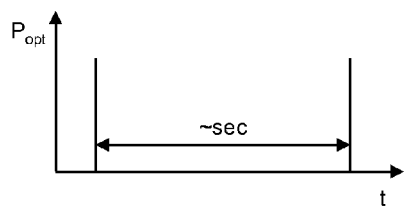
Figure 5B:
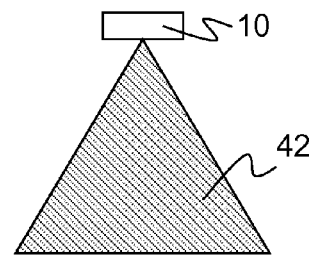
Figure 5C:
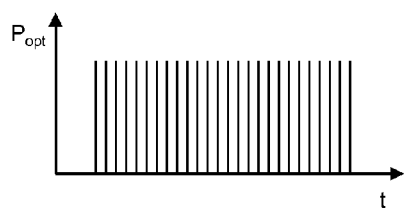
Figure 5D:
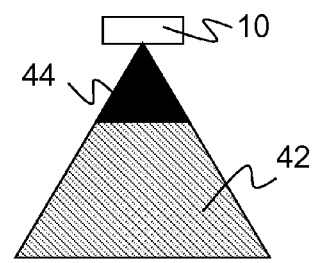
Figure 6A:
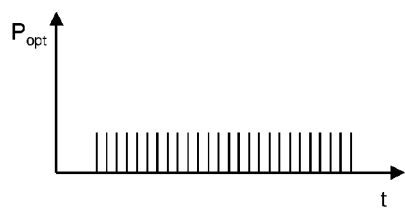
Figure 6B:
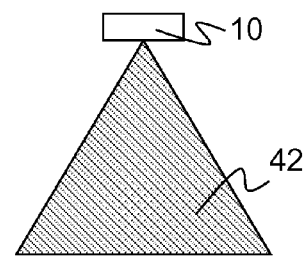
Figure 6C:
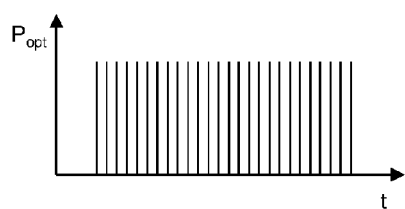
Figure 6D:
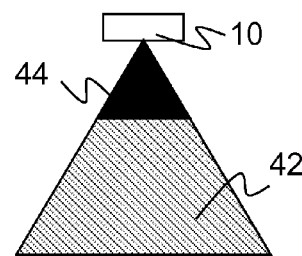
Figure 7:
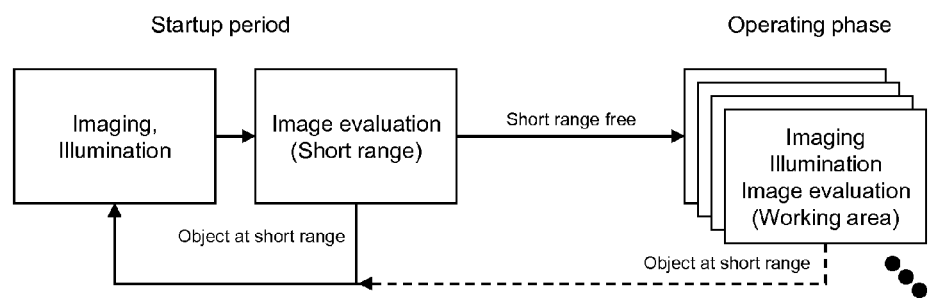

The invention will be explained in the following also with respect to further advantages and features with reference to exemplary embodiments and the enclosed drawing. The Figures of the drawing show in:

FIG. 1 a schematic three-dimensional view of an embodiment of the invention as a stereoscopic camera monitoring a robot arm from above;

FIG. 2 a flow diagram of the startup period and the operating phase of a sensor according to the invention;

FIG. 3 a schematic view to further explain the startup period in a first embodiment;

FIG. 4 a schematic view similar to FIG. 3 to further explain the startup period in another embodiment;

FIG. 5a a representation of the optical output power in dependence of time at a reduced pulse repetition frequency during the startup period;

FIG. 5b a representation of the area that is safe for the eye with the illumination according to FIG. 5a;

FIG. 5c a schematic representation analogous to FIG. 5a during an operating phase;

FIG. 5d a schematic representation of the area that is safe for the eye with the illumination according to FIG. 5c;

FIG. 6a-d representations analogous to FIGS. 5a-d with variations of the pulse power; and FIG. 7 a block diagram for explaining the course of events during startup period and operating phase in another embodiment of the invention.

FIG. 1 shows in a schematic three-dimensional view the general configuration of an embodiment of a distance measuring sensor 10 according to the principle of stereoscopy that is used for the safety monitoring of a spatial area 12. In this embodiment, the sensor 10 is made as a stereoscopic safety camera. However, the invention is independent of the manner of generating three-dimensional image data and also includes other sensors, in particular laser scanners and time-of-flight cameras as mentioned in the introduction. Likewise, the invention is not limited to safety technology. With this preliminary remark of the broader scope of application, only the example of a stereoscopic 3D safety camera will be described in detail in the following.

Two camera modules 14a, 14b are mounted at a known, fixed mutual distance, and each takes images of the spatial area 12. An image sensor 16a, 16b is provided in each camera, usually a matrix-type imaging chip that takes a rectangular pixel image, for example a CCD- or CMOS sensor. An optical imaging system 18a, 18b comprising one or more optical imaging elements is associated with each of the image sensors 16a, 16b and can in practice be realized as any known optical imaging system. The viewing angle of these optical imaging systems is represented by dashed lines in FIG. 1, each forming a pyramid of view 20a, 20b.

At the center between the two image sensors 16a, 16b an illumination unit 22 is provided. This spatial arrangement is only to be understood as an example, and the illumination unit 22 may also be arranged asymmetrically or even external to the 3D safety camera 10. The illumination unit 22 comprises a light source 24, such as one or more lasers or LEDs, as well as a pattern generating element 26 which is, for example, made as a mask, a phase plate, or a diffractive optical element. The illumination unit 22 is thus able to illuminate the spatial area 12 with a structured pattern. An illumination control 28 switches light source 24 and determines its light power. The manner of operation of illumination control 28 will be explained in more detail further below with reference to FIGS. 2 to 4.

A control 30 is connected to the two image sensors 16a, 16b and the illumination control 28, said control 30 receiving image data from the image sensors 16a, 16b and from them calculating three-dimensional image data (distance image, depth map) of the spatial area 12 by means of a stereoscopic disparity estimation. The structured illumination pattern provides a high contrast, and a structure of every image element within the illuminated spatial area 12 that can be uniquely correlated.

Known and unexpected objects may be present in the spatial area 12 monitored by the safety sensor 10. These may be a robot arm 32 as represented, but also any other machine, an operating person or anything else. The spatial area 12 provides access to a source of danger, whether because it is an access area or because a dangerous machine, like the robot arm 32, is located within the spatial area 12 itself. In order to secure this source of danger, one or more virtual protection zones and warning zones can be configured. They form a virtual fence around the dangerous machine 32. The three-dimensional evaluation allows defining of three-dimensional protection and warning zones so that a high flexibility is available.

The control 30 evaluates the three-dimensional image data for forbidden intrusions. The evaluation rules can prescribe, for example, that no object at all may be present in protection zones 34. More flexible evaluation rules provide differentiating between allowed and forbidden objects, for instance with reference to trajectories, patterns or contours, speeds, or general operating sequences which may be both taught in advance or estimated during operation from movements, heuristics or classifications.

If the control 30 detects a forbidden intrusion into a protection zone, a warning is output or the source of danger is secured, for example the robot arm 32 is stopped, via a shutdown device 36 that in turn may be integrated into the control 30. Signals relevant for safety, that is above all the switching-off signal, are output via a safety output 38 (OSSD, Output Signal Switching Device). It depends on the application whether a warning suffices or a two-level safeguarding is provided in which initially a warning is given and it is only switched off on a continued object intrusion or an even deeper intrusion. Instead of switching off, the appropriate reaction may also be the immediate transfer into a safe parking position.

The sensor 10 is designed failsafe to be usable in applications of safety technology. This means, among others, that the sensor 10 is capable of testing itself, also in cycles shorter than a required response time, in particular of also detecting defects of the illumination unit 22 and thus ensuring that the illumination pattern is available in an expected minimum intensity, and that the safety output 38 as well as the shutdown device 36 are designed safely, for example with two channels. Likewise, the control 30 is self-reliant, thus evaluates with two channels or uses algorithms which can test themselves. Such regulations are standardized for general electro-sensitive protective devices in EN 61496-1 or IEC 61496 as well as in DIN EN ISO 13849 and EN 61508. A corresponding standard for safety cameras is under preparation.

According to the invention, prior to the operating phase, in which the illumination unit 22 illuminates a working area of the sensor 10 around the robot arm 32 with an optimal light power, a startup period for the illumination unit 22 is provided, in which the illumination control 28 sets the desired light power of the illumination unit 22. The course of the startup period and the operating phase is shown in FIG. 2.

In a first step S1, the illumination control 28 activates the light source 24 with a preset maximum light power which is fixed by the requirements of laser class 1 or by other safety regulations for persons that have to be observed. The light power is sufficient to guarantee the detection capability of the sensor 10 in a provisional working area up to a highest range X. In this context, detection capability does not necessarily mean that largely complete depth maps can be calculated by means of stereoscopy, but only that the image sensors 16a, 16b generate individual images that are sufficiently illuminated.

The different working areas are illustrated in an embodiment in FIG. 3. For the sake of better overview, the sensor 10 is only represented as a simple camera. The provisional working area 40a of step S1 starts in front of the sensor 10 and has an extent D in the depth direction. The initial range X is equal to or larger than the depth extent D.

In a second step S2, it is tested whether the light range X is sufficient for the sensor function. This is not the case in the situation of FIG. 3. If the initial light range X were already to provide a sufficient illumination for the monitoring of the robot arm 32, a startup period could be dispensed with.

In a third step S3, the sufficiently illuminated provisional working area 40a is now tested for forbidden object intrusions. For example, no person should be located close to the sensor 10. If a forbidden object intrusion is detected, the startup period restarts at step S1. At the same time, in case the light power was changed during the startup period, it is reset to the original light power such that danger to persons is excluded. Thus, the startup period is an infinite loop until the forbidden intrusion is ended. Alternatively, the sensor 10 can display the startup period as failed immediately or after some loops and abort further attempts of achieving operational availability.

The detection of forbidden object intrusions takes place in a short range object detection unit 39. The depth map generated by stereoscopy is only optionally used in addition. This is because imager saturation and a limited disparity range are problematic for the generation of a sufficiently dense and complete depth map.

To that end, different criteria of the individual images of the two image sensors 16a, 16b are used, where the images usually are in the form of gray scale images when using infrared light. For example, the approach of objects into the immediate vicinity of the illumination unit 22 will with high certainty lead to a large area saturation in the images. As an estimate for the saturation, in a critical distance of 20 cm with a maximum range of 450 cm and the known variations in the remission properties of light skin and dark background, gray scale values increased by a factor of 1,500 are to be expected. This criterion is particularly easy to evaluate, while at the same time very reliable.

Another criterion is given by distinct differences between individual images, like large structures in completely different areas of the images. This is not to be expected in usual stereoscopy, where the two images show the same scenery from only a slightly offset perspective, and happens only with very close objects. A third possible criterion is based on the attempt to generate a depth map without extending the disparity range. This depth map will show large area gaps, because for very close objects no correspondencies are found within the usual correlation window. Finally, it is also conceivable to use an additional short range detector that is not shown in FIG. 1. Hybrid embodiments can also make use of several or all the criterions as explained.

If the provisional working area 40a is free of forbidden object intrusions and thus of potentially endangered persons, the illumination control 28 in a fourth step S4 increases the power of the light source 24 and with it the light range X by an amount of Y. The provisional working area 40a is moved in the direction closer to the robot arm 32 to be monitored so that the new provisional working area 40b has a larger distance from the sensor 10 than the original provisional working area 40a. The provisional working area 40b also has the constant depth extent D. The increase in light power is calculated from the power loss per surface due to the larger distance. In some situations, the initial light power and, hence, the initial light range X may still suffice for the first movements of the provisional working area 40a-c, deviating from the procedure as shown.

With the increased light power, it is again tested in step S2 whether the new light range X is sufficient to monitor the robot arm 32. If at no time a forbidden object intrusion occurs, the provisional working area 40b is moved in a loop of steps S2 to S4 analogous to the first iteration of this loop as described via an additional provisional working area 40c to the actual working area 42. Then, the condition in step S2 is satisfied that the light range X is sufficient to illuminate the working area 42 with the robot arm 32, and the startup period moves into the operating phase. The more the provisional working area 40b moves from the sensor 10, the better an evaluation of the depth map is suited for the detection of objects instead of the short range object detection unit 39. Possibly, the short range object detection unit 39 is only used in the first loop of the steps S2 to S4 at all.

During the operating phase, the control 30 monitors in a constantly processed loop in a step S5 whether a forbidden intrusion in a protection zone 34 takes place. In that case, a switching-off signal is output to the robot arm 32.

In addition, the loop tests in a step S6 whether the area up to the working area 42 is still free of persons. This may be done in two ways: Either an object detection is actually carried out in the field of vision up to the working area 42, i.e. ultimately the provisional working areas 40a-c are also monitored, or it is monitored whether an object moves into the boundary region of the working area 42 close to the sensor 10. This could, for example, be a worker who is trying to reach the sensor 10 with a ladder or a similar climbing aid. If a person comes too close to the sensor 10, the illumination unit 22 is switched off. Then, the sensor 10 is no longer ready for use, and a switching-off signal is additionally output to the robot arm 32.

The actual working area 42 with the robot arm 32 to be monitored also has the constant depth extent or thickness D. This thickness is preset by where protection zones are to be definable for the operating phase. For example, when mounting the sensor 10 to the ceiling it is not necessary to monitor a height beyond about 2.50 m above the floor since no person reaches that height. As soon as a person reaches a height of, say, 2.40 m, this is treated as a climbing attempt in step S6, and the illumination unit 22 is switched off. The working area 42 limited by the depth extent D can be monitored with considerably less effort than the entire pyramid of view. This is particularly true for stereoscopy that becomes very costly at short range due to the large disparities.

With a startup phase according to the flow diagram of FIG. 2 in an embodiment in accordance with FIG. 3, the area close to the sensor 10 in front of the actual working area 42 is tested block-wise and discreetly with successively higher light power. The distance $d_{start}$ to the provisional working area 40a is initially zero, or at least the sensor 10 is very close to the provisional working area 40a. Here, the reference of the provisional working area 40a is the boundary surface close to the sensor 10. Upon completion of the startup phase, the distance $d_{operation}$ amounts to three times the thickness D of the working area 42. Of course, modifications with different multiples and also fractions of D are also conceivable.

In an alternative embodiment explained with reference to FIG. 4 that also makes use of the flow diagram of FIG. 2, the initial provisional working area is not moved as in FIG. 3, but is rather extended and thus enlarged. This is shown by arrows 44. In this case, the method start with a thickness $D_{start}$ of the provisional working area 40 and a distance $d_{start}$ that in contrast to the embodiment of FIG. 3 relates to the far boundary surface of the provisional working area 40. During the power adaptation in the steps S2 to S4, distance and depth extent of the provisional working area 40 are both varied, until at a distance $d_{operation}$ a final working area 42 of depth extend $D_{operation}$ is reached.

Hybrid embodiments of the two embodiments described with reference to FIGS. 3 and 4 are conceivable, where the provisional working area 40, 40a-c is both moved and enlarged or reduced. Likewise, the adaptation steps in step S4 can be both fine, up to being continuous or quasi-continuous, and coarse, for example in the order of magnitude of the thickness of the working area 42. Finally, it is also conceivable to keep a specific distance between the provisional working area and the sensors 10 from the start, preferably such that the range of the permitted light power is just utilized.

In summary, the light source 24 is slowly increased in its power, starting from a permitted power for example in the range of laser class 1. At the same time, the sensor 10 makes sure that the area in front of the light source 24 is free. In effect, the provisional working zone 40, 40a-c moves away from the sensor 10 to increasing working distances, as long as no intrusions are detected except for defined allowed objects. The complex large disparities at short range at most have to be calculated initially. It is also possible to reduce this effort by an initial displacement, i.e. to already observe a specific distance to the sensor 10 at the start of the startup period. If the provisional working area 40, 40a-c and thus the area in front of the sensor 10 is free, the provisional working area is moved or enlarged and the light power is increased correspondingly. This procedure is repeated step-wise or continuously until the specified working distance and the actual working volume or working area 42 is reached.

During operation, the illumination unit 22 is switched off as soon as an object comes too close to the light source 24. To that end, the object distance is checked in order to, for example, detect a worker who climbs up to the sensor using a climbing aid. It is thus prevented that persons enter into areas of too high light power.

Nothing in particular has to be observed when switching of the sensor 10, because then the light source 24 is also switched off.

FIG. 5 illustrates the variation in the optical output power of the illumination unit 22 and its effect on the eye-safe operation. In the FIGS. 5a and 5c, the optical output power is shown in dependence of time for the startup period and the operating phase, respectively. During the startup period, the pulse repetition frequency is reduced. Consequently, the resulting optical output power is reduced. FIGS. 5b and 5d show the eye-safe illumination area 42 during the startup period and during the operating phase, respectively, i.e. with an output power according to FIGS. 5a and 5c. During the startup period, the entire region is eye-safe. During the operating phase, there exists a region 44 in which the lower laser protection class is not satisfied. However, the eye-safe area 42 includes the entire far range, and at the same time it is ensured by the method according to the invention that no persons are present in the region 44 at short range.

FIGS. 6a to 6d show in an analogous way an alternative way to reduce the optical output power. Here, the power of individual pulses is reduced instead of the pulse repetition frequency. Another possibility is to vary the pulse lengths. All these variations can also be combined, and they can also be irregular in contrast to the representation. A preferred option is variation of the pulse repetition frequency, because this merely affects the response time of the sensor 10 and not the energy-related parameters, such as range or brightness.

FIG. 7 illustrates a method according to another embodiment. During the startup period, it is tested as explained above whether the short range area is free of forbidden objects. This test is performed in an illumination or imaging mode where the eye safety is in any case ensured by illumination parameters that are adapted as compared to operation.

Once it has been excluded by evaluation of the short range region that objects are present near the sensor 10, the illumination mode is switched so that demands on the illumination for the function are satisfied, for example expressed in the parameters illumination intensity, pulse repetition frequency, or pulse length. Even though the limits for eye safety are no longer satisfied in the immediate short range, the classification of the laser device is not affected, because the accessibility of this region is excluded.

The switching between the unconditional eye-safe startup period and the operating phase being eye-safe at far range may be reversible. Then, upon intrusion of an object at short range, it is automatically switched into the startup period within one or at most a few illumination cycles, and the startup period is maintained until the monitored short range is free again. A harmful exposure of the eyes is therefore impossible.

The invention is based on the idea that laser standards require a limiting of the accessible laser radiation below a maximum permissible value. It is therefore ensured during the startup period that the area at short range of the sensor having a higher laser exposition is free of persons. This method works especially well if the light field has a high divergence, which is dangerous at short range at most and becomes harmless with increasing distance due to the strong decrease of power density. The invention can also be used for mobile systems.

The invention claimed is:

1. An optoelectronic sensor (10) for monitoring a working area (42), the working area (42) being located within a detection area (20) of the sensor (10) and in a first distance from the sensor (10), wherein the sensor (10) comprises an illumination unit (22) with a light source (24) for at least partially illuminating the working area (42), and an object detection unit (30) for detecting forbidden objects in the working area (42), wherein an illumination control (28) of the illumination unit (22) is configured to, during a startup period, initially activate the illumination unit (28) with a lower power such that a provisional working area (40, 40a-c) in a second distance from the sensor (10) less than the first distance is illuminated at most with a predetermined maximum light output; test whether there is a forbidden object intrusion into the provisional working area (40, 40a-c); and if no forbidden object intrusion is detected, activate the illumination unit (28) with a higher power such that the working area (42) is illuminated at most with the predetermined maximum light output, characterized in that the illumination control (28) comprises a short range object detection unit (39) configured to test the provisional working area (40, 40a-c) in a different way than the object detection unit (30) tests the working area (42).

2. The sensor (10) of claim 1, wherein the illumination control (28) is configured to operate the illumination unit (22) as a pulsed illumination and to control the power of the illumination unit (22) by means of at least one of a power of single pulses, a pulse repetition frequency, and a pulse length.

3. The sensor (10) of claim 1, wherein the short range object detection unit (39) comprises an additional short range detector.

4. The sensor (10) of claim 1, wherein the short range object detection unit (39) is configured to detect forbidden objects from a saturation of a light receiver (16) of the sensor (10).

5. The sensor (10) of claim 1, that is made as a distance-measuring optoelectronic sensor, in particular a stereoscopic 3D-camera, a three dimensional time-of-flight camera, or a laser scanner.

6. The sensor (10) of claim 5, that is made as a stereoscopic camera with at least two image sensors (16) and a stereoscopic evaluation unit for generating a depth map from images of the image sensors (16).

7. The sensor (10) of claim 6, wherein the short range object detection unit (39) is configured to detect forbidden objects from gaps in the depth map that affect more than a maximum number of pixels.

8. The sensor (10) of claim 6, wherein the short range object detection unit (39) is configured to detect forbidden objects from differences between the respective simultaneously generated images of the two image sensors that affect more than a maximum number of pixels.

9. The sensor (10) of claim 1, wherein the illumination control (28) is configured to de-energize the illumination unit (22) or to restart the startup period if a forbidden object intrusion into the provisional working area (40, 40a-c) is detected.

10. The sensor (10) of claim 1, wherein the illumination control (28) is configured to increase the second distance up to the first distance in distance increments and to activate the illumination unit (22) with a higher power upon increase of the second distance such that the respective provisional working area (42) in the modified second distance is illuminated at most with the predetermined maximum light output.

11. The sensor (10) of claim 10, wherein the distance increments are so small that the provisional working area (42) runs through the interval of the original second distance to the first distance virtually continuously.

12. The sensor (10) of claim 10, wherein the distance increments correspond to a depth dimension of the working area (42).

13. The sensor (10) of claim 1, wherein a shut down device (36) is provided that is configured to detect forbidden object intrusions into the working area (42) by means of the object detection unit (30) in an operating phase following the startup period and to output a shutdown signal if a forbidden intrusion is detected.

14. The sensor (10) of claim 1, wherein the illumination unit (22) comprises a laser light source (24) and a pattern generating element (26) for generating a structured light pattern in the provisional working area (40; 40a-c) or the working area (42).

15. A method for monitoring a working area (42), the working area (42) being located within a detection area (20) of an optoelectronic sensor (10) and in a first distance from the sensor (10), wherein the working area is at least partially illuminated by means of an illumination unit (22), and wherein forbidden objects in the working area (42) are detected in an object detection, wherein, during a startup period, the illumination unit (28) is initially activated with a lower power such that a provisional working area (40, 40a-c) in a second distance from the sensor (10) less than the first distance is illuminated at most with a predetermined maximum light output; it is tested, in a short range detection, whether there is a forbidden object intrusion into the provisional working area (40, 40a-c); and if no forbidden object intrusion is detected, the illumination unit (28) is activated with a higher power such that the working area (42) is illuminated at most with the predetermined maximum light output, characterized in that the short range object detection uses a different method than the object detection.

16. The method of claim 15, wherein the illumination unit (22) transmits a pulsed illumination, and wherein the power of the illumination is controlled by means of at least one of a power of single pulses, a pulse repetition frequency, and a pulse length.

17. The method of claim 15, wherein, in the short range object detection, forbidden objects are detected from a saturation of a light receiver (16) of the sensor (10).

18. The method of claim 15, wherein two image sensors (16) of the sensor (10) take images of the detection area (20), a depth map is generated from two respective, simultaneously taken images by stereoscopic evaluation, and the short range object detection detects forbidden objects from gaps in the depth map that affect more than a maximum number of pixels or from differences between the two simultaneously taken images that affect more than a maximum number of pixels.

19. The method of claim 15, wherein the illumination unit (22) is de-energized or the startup period is restarted if a forbidden object intrusion into the provisional working area (40, 40a-c) is detected.

20. The method of claim 15, wherein the second distance is increased up to the first distance in distance increments, and the illumination unit (22) is activated with a higher power upon increase of the second distance such that the respective provisional working area (42) in the modified second distance is illuminated at most with the predetermined maximum light output, wherein in particular the distance increments are so small that the provisional working area (42) runs through the interval of the original second distance to the first distance virtually continuously or wherein the distance increments correspond to a depth dimension of the working area (42).

* * * * *